(12) United States Patent
Yip et al.

(10) Patent No.: US 6,768,581 B1
(45) Date of Patent: Jul. 27, 2004

(54) COATED LENS EXHIBITING SUBSTANTIALLY BALANCED REFLECTANCE

(75) Inventors: Brandon Yip, Blackwood (AU); Brian Douglas Adams, Huntfield Heights (AU); Paraic Begley, Auldana (AU)

(73) Assignee: Sola International Holdings Ltd., Lonsdale (AU)

(*) Notice: Subject to any disclaimer, the term of this patent is extended or adjusted under 35 U.S.C. 154(b) by 0 days.

(21) Appl. No.: 09/856,328

(22) PCT Filed: Nov. 19, 1999

(86) PCT No.: PCT/AU99/01029

§ 371 (c)(1),
(2), (4) Date: Aug. 14, 2001

(87) PCT Pub. No.: WO00/33111

PCT Pub. Date: Jun. 8, 2000

(30) Foreign Application Priority Data

Nov. 30, 1998 (AU) .............................................. PP 7407

(51) Int. Cl.⁷ .............................................. G02B 13/14
(52) U.S. Cl. ...................... 359/355; 359/212; 359/580; 359/581; 359/582; 359/584; 359/586; 359/588; 359/589; 359/590; 427/164; 427/165; 428/421; 428/422
(58) Field of Search ................................. 359/212, 580, 359/581, 582, 584, 586, 588, 589, 590, 355; 427/164, 165; 428/421, 422

(56) References Cited

U.S. PATENT DOCUMENTS

| | | |
|---|---|---|
| 2,758,510 A | 8/1956 | Auwärter |
| 3,679,291 A | 7/1972 | Apfel et al. |
| 3,901,997 A | 8/1975 | Groth |
| 3,936,579 A | 2/1976 | Ogasawara et al. |
| 3,978,272 A | 8/1976 | Donley |
| 4,022,947 A | 5/1977 | Grubb et al. |
| 4,070,097 A | 1/1978 | Gelber |
| 4,172,156 A | 10/1979 | Ritter et al. |
| 5,054,902 A | 10/1991 | King |
| 5,147,125 A | 9/1992 | Austin |
| 5,332,618 A | 7/1994 | Austin |
| 5,543,966 A * | 8/1996 | Meyers ...................... 359/565 |
| 5,719,705 A | 2/1998 | Machol |
| 5,729,323 A | 3/1998 | Arden et al. |
| 5,952,084 A | 9/1999 | Anderson et al. |
| 5,953,147 A * | 9/1999 | Brandt et al. ............... 359/212 |
| 6,142,624 A | 11/2000 | Morris et al. |

OTHER PUBLICATIONS

Philip Baumeister, et al.; Optical Interference Coatings; Scientific American, Dec. 1970, pp. 59–75.

* cited by examiner

Primary Examiner—Audrey Chang
Assistant Examiner—Craig Curtis
(74) Attorney, Agent, or Firm—Burns, Doane, Swecker & Mathis, L.L.P.

(57) ABSTRACT

A coated optical lens includes a lens element and a coating on the surface of the lens element. The coating exhibits a substantially balanced reflectance from the center to a radius proximate the edge of the lens element. The term "substantially balanced reflectance" means that where the thickness of the coating varies across the surface of the lens, the lightness, hue and chroma of the reflectance vary in a balanced manner such that variations in visual appearance are either imperceptible or generally acceptable to an observer. For example, variations in chromatic attributes, such as hue, from the center to the edge of the lens may be balanced by a reduction in lightness from the center to the edge. Preferably, the lens element includes a surface of high curvature upon which the balanced reflectance coating is deposited.

28 Claims, 3 Drawing Sheets

COATED LENS EXHIBITING SUBSTANTIALLY BALANCED REFLECTANCE

The present invention relates to optical articles bearing a coating which displays superior uniformity of reflection.

The optical articles according to the present invention are preferably employed in the preparation of articles such as optical lenses, including spectacle lenses, including sunglass lenses, visors, shields, glass sheets, protective screens, and the like.

Anti-reflection coatings are commonly deposited on ophthalmic and sunglass lenses in order to minimise spurious reflections, which both detract from the wearer's vision and are also cosmetically unpleasing. These coatings commonly consist of multilayer, dielectric films of thicknesses chosen so that interference effects cause destructive cancellation of reflections over most of the visible spectrum.

A coating that is not anti-reflective and that changes the reflectance of the lens can be described as a "mirror" coating. Such mirror coatings are often used in the manufacture of sunglass lenses, to produce fashionable lens colours.

When mirror and anti-reflection coatings are deposited on curved substrates (such as ophthalmic lenses), regardless of the deposition method used (e.g. evaporative, sputtered, etc.) geometrical factors result in the coating thickness being non-uniform and varying systematically over the surface of the lens. The coating thickness is typically greatest where the surface of the substrate is most normal to the incident flux of particles, and thinner where the surface faces the flux at an angle. For ophthalmic lenses, which are normally mounted with their centres facing the particle source, this means a coating that is thickest in the centre and that becomes thinner towards the edge of the lens element. This effect becomes more pronounced as the lens becomes more highly curved.

The coating thickness variations manifest themselves as visible variations in the reflectance from the coated lens. The colour (specified by "lightness", "hue" and "chroma") of the residual reflection changes from the centre to the edge of the lens, an effect referred to as "colour rolloff." For lenses of normal curvature, the colour rolloff is barely noticeable and cosmetically, the lenses are considered to be acceptable. However, for very highly curved lenses, the colour rolloff is particularly noticeable and is generally considered to be unsatisfactory.

One method proposed in the prior art to reduce colour rolloff is to mount the substrate on a "planetary rotation" stage, which spins the lens about its own axis at the same time that it rotates about another central axis. The result of the complex substrate motion in the deposition chamber is that the flux of coating material is more evenly distributed over the surface of the lens, resulting in a coating that is more uniform over the substrate than would otherwise be the case. Planetary rotation is not the only option—any substrate motion at all will tend to reduce coating thickness non-uniformities. Unfortunately, implementing such substrate movement in the deposition chamber necessary involves mechanical complexity and a likely decrease in the total number of substrates that can be coated simultaneously in the apparatus, which is a severe disadvantage in a commercial production process.

It would accordingly be a significant advance in the art if ophthalmic lenses could be provided with a coating or coatings of general applicability which could reduce the phenomenon of "colour rolloff", but without the need for "planetary rotation" apparatus.

Accordingly, it is an object of the present invention to overcome, or at least alleviate, one or more of the difficulties or deficiencies related to the prior art.

Accordingly, in a first aspect of the present invention there is provided a coated optical lens including
 a lens element; and
 a coating on a surface of the lens element exhibiting a substantially balanced reflectance from the centre to a radius proximate the edge of the lens element.

The lens element may preferably include a surface of high curvature, upon which the balanced reflectance coating is deposited. By the term "surface of high curvature", we mean a surface having a base curve approximately 6 Dioptres (D) or greater, preferably 6 D to 20 D, more preferably approximately 8 D to 16 D.

The lens element may be either optically clear or tinted (light absorbing), such as a sunglass lens, ophthalmic lens element, visor or the like.

By the term "ophthalmic lens element", as used herein, we mean all forms of individual refractive optical bodies employed in the ophthalmic arts, including, but not limited to, lenses, lens wafers and semi-finished lens blanks requiring further finishing to a particular patient's prescription.

The visual appearance of the coated optical lens in reflected light-can be quantified by measuring its reflectance spectrum in a spectrophotometer. It is well known that the reflectance of thin film coatings tends to vary with the angle of the incident light. When we speak of the reflectance from the lens we imply the reflectance of light incident at angles of 0 to approximately 30 degrees to the normal to the surface of the lens, as would typically be the case for the reflected light seen by an observer standing directly in front of a person wearing the coated lenses as spectacles. This spectral information may be reduced to three colour coordinates—a "lightness" corresponding primarily to the luminous intensity of the reflected light, and two chromatic attributes, "hue" and "chroma", corresponding to the general colour (e.g. "red, "blue", "green" etc.) and its vividness. ("The Measurement of Appearance", $2^{nd}$ ed., R. S. Hunter and R. W. Harold, Wiley, New York, 1987).

By the term "substantially balanced reflectance" we mean that where the thickness of the coating varies across the surface of the lens, the lightness, hue and chroma of the reflectance vary in a balanced manner such that variations in visual appearance are either imperceptible or generally acceptable to an observer. For example, variations in chromatic attributes, such as hue, from the centre to the edge of the lens may be balanced by a reduction in lightness from the centre to the edge.

Perceived variations in appearance may be quantified by calculating "CMC colour differences," as developed by the Colour Measurement Committee of the Society of Dyers and Colourists. A CMC colour variation of $\Delta E_{CMC(2:1)}=1$ is the limit of acceptability for textiles. Applicants have found that this is too stringent a tolerance for anti-reflection or mirror coated lenses in the ophthalmic industry. Variations between anti-reflection coated lenses of approximately 3 or less are acceptable and Applicants have observed that colour differences of up to 3–11 may exist across a lens that has an acceptably uniform appearance. Variations of up to 20 may exist in lenses that are visibly non-uniform in colour, yet that are still acceptable in appearance.

Figure 1:
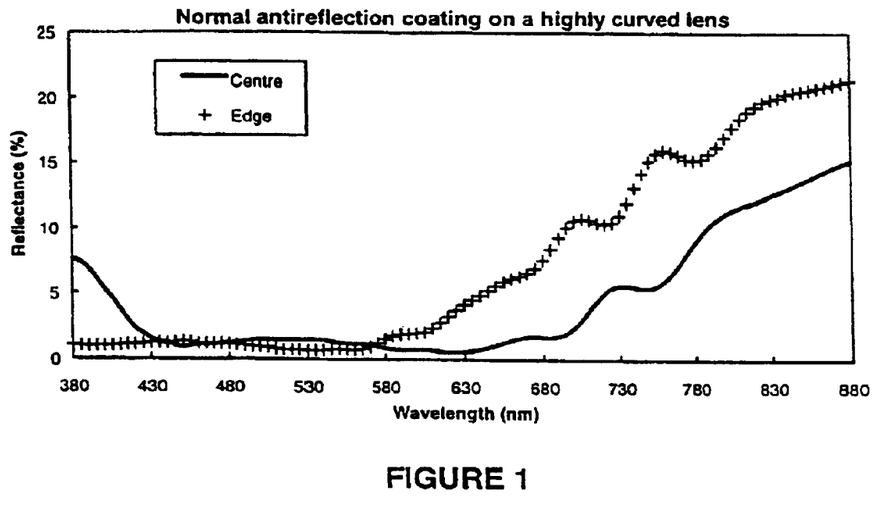
FIG. 1 illustrates a measured reflectance spectrum (for light at normal incidence) of a lens coated on both sides with a known multilayer, anti-reflection coating.

The normal incidence reflectance spectrum of a highly curved (16 dioptre) lens coated with a typical commercial anti-reflection coating is shown in FIG. 1.

The reflectance of light of essentially normal incidence measured at the centre of the tens element is low in the visible spectrum (roughly 380–780 nm), but is significantly greater for longer wavelengths. Toward the edge of the lens element (e.g. at a radius of 20 mm from the centre), the total coating thickness may be reduced to 80% of the thickness at the centre of the lens. This is due to the curvature of the lens and the geometry of the deposition system as described above. As shown in the figure, the spectrum shifts to the left relative to the spectrum from the centre of the lens. This is a well-known phenomenon to those familiar with the art and theory of thin films. As a consequence, the higher reflectance "red tail" seen in FIG. 1 moves further into the region of spectral sensitivity of the human eye and causes the appearance of the lens to redden toward the edges. The CMC colour difference (for CIE illuminant C) between the centre of the lens and at the radius of 20 mm is $\Delta E_{CMC(2:1)}=27$. The lens displays substantial colour roll-off, changing from faint green in the centre to bright red/orange at the edges and is unacceptable.

In contrast, the balanced reflectance coating according to the present invention has a substantially more uniform appearance from the centre to the edge of the lens element (see FIG. 2 below).

Figure 2:
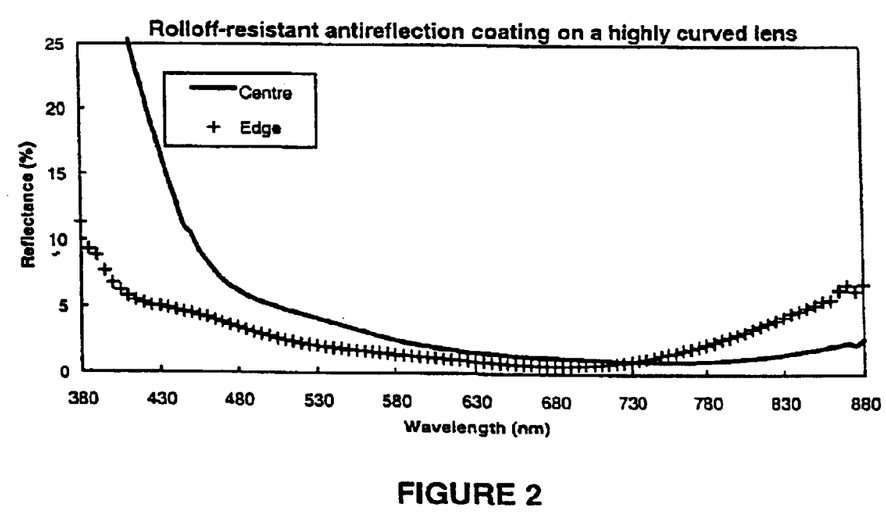
FIG. 2 illustrates a measured reflectance spectrum (for light at normal incidence) of a lens coated on both sides with a multilayer, ant-reflection coating corresponding to the present invention.

FIG. 2 compares the reflectance spectra at the centre and at a radial distance of 20 mm from the centre on a 16 dioptre lens now coated with the roll-off-resistant coating. In contrast to the previous standard anti-reflection coating, this coating (at the centre of the lens) exhibits substantially lower photopic reflectance at longer wavelengths. Indeed, it is anti-reflective beyond 880 nm. When the coating thickness reduces away from the centre of the lens and the reflectance spectrum shifts to the left, relatively little intensity is introduced in the red region of the spectrum. The CMC colour difference (for CIE illuminant C) between the centre of the lens and at the radius of 20 mm is $\Delta E_{CMC(2:1)}=10$. The lens displays relatively little colour roll-off. The lens changes from light blue in the centre to pale blue/purple at the edges and is quite acceptable.

This may be achieved, inter alia, by providing a balanced reflectance coating for a lens element which, in use, exhibits a substantially constant low photopic reflectance in the red-to-infra-red wavelength range of approximately 620 to 880 nm proximate the centre of the lens element.

Preferably, the photopic reflectance is less than approximately 3%. The reflectance is preferably low where the eye is most sensitive, in the region of approximately 550 nm.

The low reflectance in the near infra-red spectrum is clearly an important characteristic of the balanced reflectance coating, but for certain coloured coatings this alone may not ensure that it displays acceptable colour roll-off e.g. on a highly curved lens. For example, if the coating displays a red colour in the centre of the lens, even if the reflectance in the near infra-red is low, the colour will roll through yellow and green as the thickness rolls off from centre to edge of the lens. If a uniform hue is desired the roll-off will not be acceptable. If, however, a multicoloured lens, which is still functionally anti-reflective as its hue changes is the desired result, then the lens will exhibit acceptable colour roll-off, because the colour roll-off is balanced by luminous reflectance roll-off (as opposed to hue) which is acceptable.

The balanced reflectance coating is not restricted to functioning as an anti-reflection coating. The balance of reflectance coating may alternatively or in addition function as a light absorbing, or tint coating, in which case it may also have an asymmetric reflectance, such that from the wearer's side of the lens element the coating is anti-reflective. The balanced reflectance coating may also function as a reflective or mirror coating.

The balanced reflectance coating may exhibit a substantially constant low photopic reflectance in the wavelength range of approximately 620 to 880 nm, the photopic reflectance preferably being less than approximately 1.5%.

The balanced reflectance coating may, for example, exhibit a reflected colour difference from the centre to a radius of approximately 20 mm on the lens surface of less than approximately 11 CMC colour difference units.

Alternatively, the coating may exhibit a reflected colour difference ($\Delta E$) from the centre to a radius of approximately 20 mm on the lens surface of greater than approximately 11 CMC colour difference units, the colour difference being balanced by a complementary reduction in luminous intensity.

More preferably the coating exhibits a reflected colour difference ($\Delta E$) of from approximately 11 to 20 CMC colour difference units.

In this embodiment the coating is preferably a multicoloured, anti-reflective coating.

In accordance with the present invention, one or both surfaces of an optical lens element may be coated with the balanced reflectance coating.

In a preferred aspect, the lens element may be of generally ovaline shape and is located on the surface of a sphere whose radius of curvature corresponds to 11 D or above, a toroid where the horizontal radius of curvature corresponds to 11 D or above, or a surface where the radius of curvature changes across at least one section of the lens aperture.

The lens element may be of the type described in International Patent Application PCT/AU98/00872 "Spectacle Frames" to Applicants, the entire disclosure of which is incorporated herein by reference; or in Australian Provisional Patent Application PP4748 "Optical Lens" to Applicants, the entire disclosure of which is incorporated herein by reference.

It will be appreciated that while the balanced reflectance coating can be beneficially applied to a highly curved lens, its use is not restricted to such an application. For instance, the balanced reflectance coating can be applied in a situation where the deposition process is imperfectly controlled. In such a case, variations in coating thickness caused by the deposition process (rather than the high curvature of the lenses being coated) are less visible, by virtue of the optical properties of the balanced reflectance coating.

Where the lens element is an ophthalmic lens element, the ophthalmic lenses may be formed from a variety of different lens materials, and particularly from a number of different polymeric plastic resins. A common ophthalmic lens material is diethylene glycol bis(allyl carbonate) or CR39 (PPG Industries). Lens materials with higher refractive indices are now growing in popularity. Other examples of lens materials that may be suitable for use with the invention include other acrylics, other allylics, styrenics, polycarbonates, vinylics, polyesters and the like.

In a preferred aspect, the balanced reflectance coating may be a multi-layer coating. The balanced reflectance coating may include a plurality of layers, the thickness and/or number of which being selected to reduce the phenomenon of "colour rolloff". The balanced reflectance coating may further provide an interference effect, e.g. an anti-reflective or mirror effect.

More preferably the balanced reflectance coating includes a plurality of layers, wherein the thickness and/or number of the respective layers are selected to provide a substantially balanced reflectance in response to visual effects generated by variations in thickness of the coating in use, for example, as may occur when applied to a surface of a lens of high curvature.

In this embodiment, the coating may include a plurality of layers of differing refractive index wherein the thickness and/or number of the respective layers are selected to balance the variation of any combination of reflectance lightness, hue and chroma.

More preferably, the balanced reflectance coating exhibits a substantially constant low photopic reflectance in the red-to-infra-red wavelength range of approximately 620 to 880 nm, the photopic reflectance preferably being less than approximately 3%. The reflectance is preferably low where the eye is most sensitive, in the region of approximately 550 nm, so that the coating has an anti-reflective character.

The number and/or thickness of the layers may be selected utilising suitable computer software, adapted to minimise the variation of any combination of reflected lightness, hue or chroma accompanying variations in coating thickness.

In addition other desired coating properties may be provided at the same time.

The layers of differing refractive index may be formed from any suitable material. The low and high refractive index layers may be formed of a dielectric material. Preferably the dielectric layers may be formed from metal oxides, fluorides or nitrides and diamond-like carbon. Preferably the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $TiO_3$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF_2$, $NaF$, $Na_3AlF_5$, $Na_5Al_3Fl_{14}$, $NdF_3$, $PbF_2$, $PrF_3$, $SrF_2$, $ThF_4$, $ZrF_4$, $Si_3N_4$, $AlN$.

Optionally the dielectric materials may include standard dopants, for example other materials or metal compounds. See for example U.S. Pat. No. 3,914,516 "Balzers".

Alternatively, the layers of differing refractive index may be formed from layers of polymeric materials having varying refractive index. Such polymeric materials may be produced utilising plasma enhanced chemical vapour deposition (PECVD) techniques. See for example European patent EP 0916683 "Clariant International Ltd".

A silica ($SiO_2$) or magnesium fluoride ($MgF_2$) material is preferred for the lower index layers.

The higher refractive index layer may exhibit a refractive index of approximately 2.0 or greater. A titanium oxide ($TiO_2$) or combination of titanium and praseodymium oxide ($TiO_2+Pr_2O_3$) is preferred for the higher index layer(s). Such a combination may have a refractive index at 500 nm of approximately 2.15.

In a preferred form, the balanced reflectance coating may include a total of 2 to 6 alternating layers of differing refractive index, preferably 4 to 6 alternating layers.

Alternatively, the balanced reflectance coating may be formed of dielectric and metallic layers. Preferably the dielectric layers may be formed from metal oxides, fluorides or nitrides and diamond-like carbon. Preferably the dielectric material is selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $TiO_3$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF_2$, $NaF$, $Na_3AlF_6$, $Na_5Al_3Fl_{14}$, $NdF_3$, $PbF_2$, $PrF_3$, $SrF_2$, $ThF_4$, $ZrF_4$, $Si_3N_4$, $AlN$. Preferably the metallic material is selected from the metals, metal oxides or nitrides of one or more of Aluminium (Al), Chromium (Cr), Niobium (Nb), Nickel (Ni), Palladium (Pd), Tin (Sn), Tantalum (Ta), Titanium (Ti), Tungsten (W) or Zirconium (Zr).

A silica ($SiO_2$) or magnesium fluoride ($MgF_2$) material is preferred for the low index layers.

Chromium (Cr) or Niobium (Nb) is preferred for the metallic layers.

The optical lens according to the present invention may further include one or more additional coatings. Accordingly in a further aspect of the present invention there is provided a multi-coated optical lens including a lens element;

a coating on a surface of the lens element exhibiting a substantially balanced reflectance from the centre to a radius proximate the edge of the lens element; and one or more secondary coatings which provide a desirable optical and/or chemical and/or mechanical property to the optical article.

Preferably, the lens element includes a surface of high curvature upon which the balanced reflectance coating is deposited.

More preferably, in use, the coating exhibits a reflected colour difference from the centre to a radius of approximately 20 mm on the lens surface of less than approximately 11 CMC colour difference units or less.

Alternatively, the coating exhibits a reflected colour difference ($\Delta E$) from the centre to a radius of approximately 20 mm on the lens surface of greater than approximately 11 CMC colour difference units, the colour difference being balanced by a complementary reduction in luminous intensity The secondary coating(s) may overlay or underlay the balanced reflectance coating or be applied to a second surface of the lens element.

The secondary coating(s) may be of any suitable type. The secondary coating(s) may be selected from one or more of an anti-reflective, abrasion resistant, impact-resistant or hydrophobic coating. An abrasion-resistant coating is preferred. The combination of an abrasion resistant coating and an anti-reflective coating is particularly preferred.

Applicants have further noted that, where the balanced reflectance coating is applied to both surfaces of an ophthalmic lens element it is possible to improve optical performance, including colour uniformity, on highly curved substrates even further by balancing the colour variations between the two surfaces. It may further be possible to reduce or eliminate other optical aberrations, such as "ghost images" which may be generated by reflective coatings.

Accordingly, in a preferred aspect of the present invention, there is provided a multicoated optical lens including a lens element;

a first coating on the front surface of the lens element; and a secondary coating on the back surface of the lens element; the first and second coatings in combination exhibiting a substantially balanced reflectance from the centre to a radius proximate the edge of the lens element.

The first coating on the front surface may be similar to the balanced reflectance coatings described above.

The secondary coating may function to reduce optical aberrations, such as "ghost images". The secondary coating exhibits a difference in lightness or hue relative to the first coating, for example a reduction in lightness.

Alternatively, the secondary coating may exhibit a reflectance peak which is spectrally displaced with respect to the reflectance peak of the first coating. The secondary coating consequently exhibits a different hue to the first coating.

In a further preferred aspect of the present invention, one or both surfaces of the optical article may be subjected to a surface treatment to improve bondability and/or compatibility of the balanced reflectance and/or secondary coating. The surface treatment may be selected from one or more of the group consisting of plasma discharge, corona discharge, glow discharge, ionising radiation, UV radiation, flame treatment and laser, preferably excimer laser treatment. A plasma discharge treatment is preferred. The surface treatment, alternatively or in addition, may include incorporating another bonding layer, for example a layer including a metal or metal compound selected from the group consisting of one or more of Chromium, Nickel, Tin, Palladium, Silicon, and/or oxides thereof.

The optical article may be a sunglass lens of the wrap-around or visor type, for example of the type described in International Patent Application PCT/AU97/00188 "Improved Single Vision Lens" to Applicants, the entire disclosure of which is incorporated herein by reference.

In a further aspect of the present invention, there is provided a method for preparing a coated optical lens, which method includes providing a lens element, a coating exhibiting a substantially balanced reflectance from the centre to a radius proximate the edge of the lens element; and depositing the coating on a surface of the lens element.

Preferably the lens element includes a surface of high curvature upon which the balanced reflectance coating is deposited. More preferably the balanced reflectance coating is applied to both surfaces of the lens element.

According to the present invention it has been found that, following the method mentioned above, it is possible to achieve a relatively thin, balanced reflectance coating with consequent advantages in both optical and mechanical properties.

Preferably the method further includes providing a lens element, a high refractive index material, and a low refractive index material;

depositing overlapping layers of high and low refractive index material on a surface of the optical lens element, wherein the thickness and/or number of the respective layers are selected to balance the variation of any combination of reflected lightness (luminous intensity), hue and chroma.

The balanced reflectance coating may further provide a desired interference effect, preferably an anti-reflective effect or mirror effect.

In a preferred aspect the high and low refractive index materials, preferably $TiO_2$, $Pr_2O_3/TiO_2$ and $SiO_2$, are deposited as alternating layers.

Alternatively, the method may include providing a lens element;

a dielectric material selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $TiO_3$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF_2$, $NaF$, $Na_3AlF_6$, $Na_5Al_3Fl_{14}$, $NdF_3$, $PbF_2$, $PrF_3$, $SrF_2$, $ThF_4$, $ZrF_4$, $Si_3N_4$, $AlN$, or diamond-like carbon; and a metallic material selected from the metals, metal oxides or nitrides of one or more of Aluminium (Al), Chromium (Cr), Niobium (Nb), Nickel (Ni), Palladium (Pd), Tin (Sn), Tantalum (Ta), Titanium (Ti), Tungsten (W) or Zirconium (Zr)

depositing overlapping layers of dielectric and metallic material on a surface of the optical lens element, the number and/or thickness of the respective layers being selected to balance the variation of any combination of reflected lightness, hue and chroma.

Preferably, the dielectric material is magnesium fluoride ($MgF_2$) or silica ($SiO_2$); and the metallic material is Niobium (Nb) or Chromium (Cr).

The deposition step may be a vacuum deposition step. The deposition step may be conducted in a coating apparatus. A box coater or sputter coater may be used.

The balanced reflectance coating may preferably be formed on the surfaces of the substrate according to the process and the box coaters as described in the Italian Patent No. 1.244.374 the entire disclosure of which is incorporated herein by reference.

In accordance with said method, the various layers of the balanced reflectance coating may be deposited in subsequent steps utilising a vacuum evaporation technique and exposing the growing layers to a bombardment of a beam of ions of inert gas.

Moreover, in accordance with the preferred method, the deposition of the layers may be achieved at a low temperature (generally below 80° C.), using an ion beam having a medium intensity (meaning the average number of ions that reach the substrate) included between approximately 30 and 100 $\mu A/cm2$ and the energy included between approximately 50 and 100 eV.

Further characteristics and advantages of the present invention will be apparent from the following description of drawings and examples of embodiments of the present invention, given as indicative but not restrictive.

EXAMPLE 1

Standard Anti-reflection Coating

FIG. 1 illustrates a measured reflectance spectrum (for light at normal incidence) of a 16 dioptre polycarbonate lens coated on both sides with an abrasion-resistant coating and a typical commercial multilayer, anti-reflection coating.

The reflectance at the centre of the lens is low in the visible spectrum (roughly 380–780 nm), but is significantly greater for longer wavelengths. Toward the edge (at a radius of 20 mm), the total coating thickness is reduced to 80% of the thickness at the centre of the lens. This is due to the curvature of the lens and the geometry of the deposition system, a Satis 1200 evaporative box coater. As shown in the figure, the spectrum shifts to the left relative to the spectrum from the centre of the lens. This is a well-known phenomenon to those familiar with the art and theory of thin films. As a consequence, the higher reflectance "red tail" seen in FIG. 1 moves further into the region of spectral sensitivity of the human eye and causes the appearance of the lens to redden toward the edges. The CMC colour difference (for CIE illuminant C) between the centre of the lens and at the radius of 20 mm is $\Delta E_{CMC(2:1)}=27$. The lens displays substantial colour roll-off, changing from faint green in the centre to bright red/orange at the edges and is unacceptable.

TABLE 1

Standard commercial anti-reflection coating

| Layer | Thickness (nm) |
|---|---|
| Polycarbonate substrate | |
| SiO2 | 173 |
| Pr2O3/TiO2 (n(500 nm) = 2.05) | 23.4 |
| SiO2 | 18.7 |
| Pr2O3/TiO2 (n(500 nm) = 2.05) | 93.2 |
| SiO2 | 82.6 |
| Hydrophobic | 10 |

EXAMPLE 2
Balanced Reflectance Anti-reflection Coating with Low Variation in Hue Table 2 shows the optical design for an anti-reflection coating whose reflected colour, particularly its hue, is robust to colour roll-off when its thickness varies.

FIG. 2 compares the reflectance spectra measured at the centre and at a radius of 20 mm on a 16 dioptre CR39 lens coated on both sides with the balanced reflectance coating. In contrast to the standard anti-reflection coating of the previous example, this coating (at the centre of the lens) exhibits substantially lower photopic reflectance at longer wavelengths. Indeed, it is anti-reflective beyond 880 nm. When the coating thickness reduces away from the centre of the lens and the reflectance spectrum shifts to the left, relatively little intensity is introduced in the red region of the spectrum. The CMC colour difference (for CIE illuminant C) between the centre of the lens and at the radius of 20 mm is $\Delta E_{CMC(2:1)}=10$.

The lens displays relatively little colour roll-off, particularly in its hue. The lens changes from light blue ($h^*=292°$) in the centre to pale blue/purple ($h^*=281°$) at the radius of 20 mm. The luminous intensity of the reflection concurrently reduces from 3.4% to 1.8%.

The result is a coating that demonstrates substantially improved colour uniformity on highly curved substrates, without the requirement for additional substrate motion during deposition.

TABLE 2

Optical design for a balanced reflectance anti-reflection coating

| Layer | Thickness (nm) |
|---|---|
| Hard resin substrate | |
| TiO2 (n(500 nm) = 2.15) | 15.9 |
| SiO2 | 32.5 |
| TiO2 (n(500 nm) = 2.15) | 147 |
| SiO2 | 102 |

EXAMPLE 3
Balanced Reflectance Anti-reflection Coating with Low Variation in Lightness Table 3 shows the optical design for another anti-reflection coating whose reflected colour is robust to colour roll-off when its thickness varies.

Figure 3:
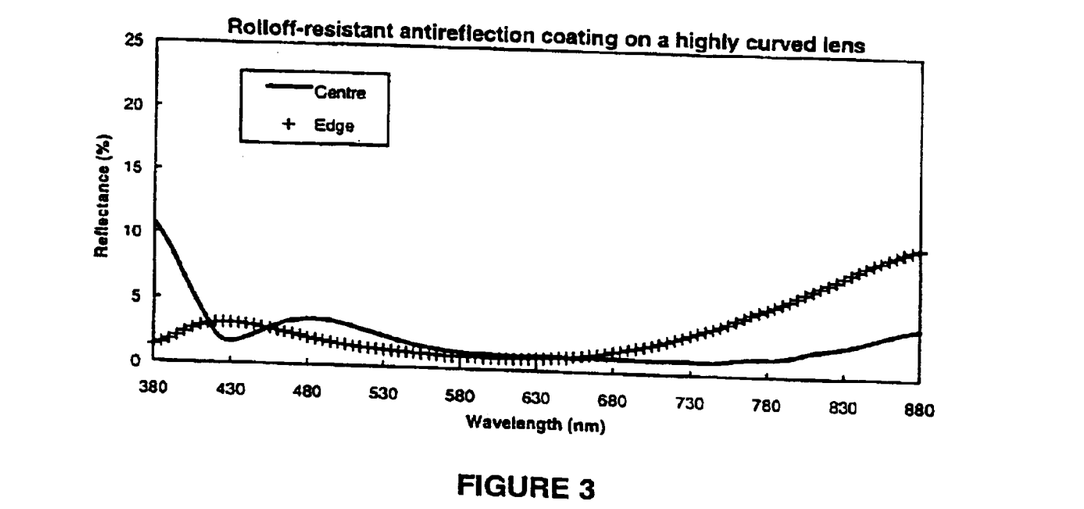
FIG. 3 compares the typical reflectance spectra measured at the centre and at a radius of 20 mm on a 16 dioptre polycarbonate lens coated on both sides with the balanced reflectance coating.

FIG. 3 compares the typical reflectance spectra measured at the centre and at a radius of 20 mm on a 16 dioptre polycarbonate lens coated on both sides with the roll-off-resistant coating. (The spectra are the averages of measurements taken on 27 different coated lenses.) The CMC colour difference (for CIE illuminant C) between the centre of the lens and at the radius of 20 mm is $\Delta E_{CMC(2:1)}=16$.

The lens displays relatively little colour roll-off, particularly in its luminance. The lens changes from pale green ($h^*=224°$) in the centre to pale blue/purple ($h^*=289°$) at the radius of 20 mm. While the change in hue is noticeable, it is not unpleasant and is judged to be acceptable because the luminous intensity of the reflection concurrently reduces from 1.8% to only 1.2%.

TABLE 3

Optical design for a balanced reflectance anti-reflection coating

| Layer | Thickness (nm) |
|---|---|
| Polycarbonate substrate | |
| Abrasion-resistant coating | 2500 |
| SiO2 | 18 |
| Pr2O3/TiO2 (n(500 nm) = 2.05) | 17.9 |
| SiO2 | 36.7 |
| Pr2O3/TiO2 (n(500 nm) = 2.05) | 140.2 |
| SiO2 | 91.8 |

EXAMPLE 4
Balanced Reflectance Anti-reflection Coating with High Variation in Hue Table 4 shows the optical design for another anti-reflection coating whose reflected lightness is robust to colour roll-off when its thickness varies.

Figure 4:
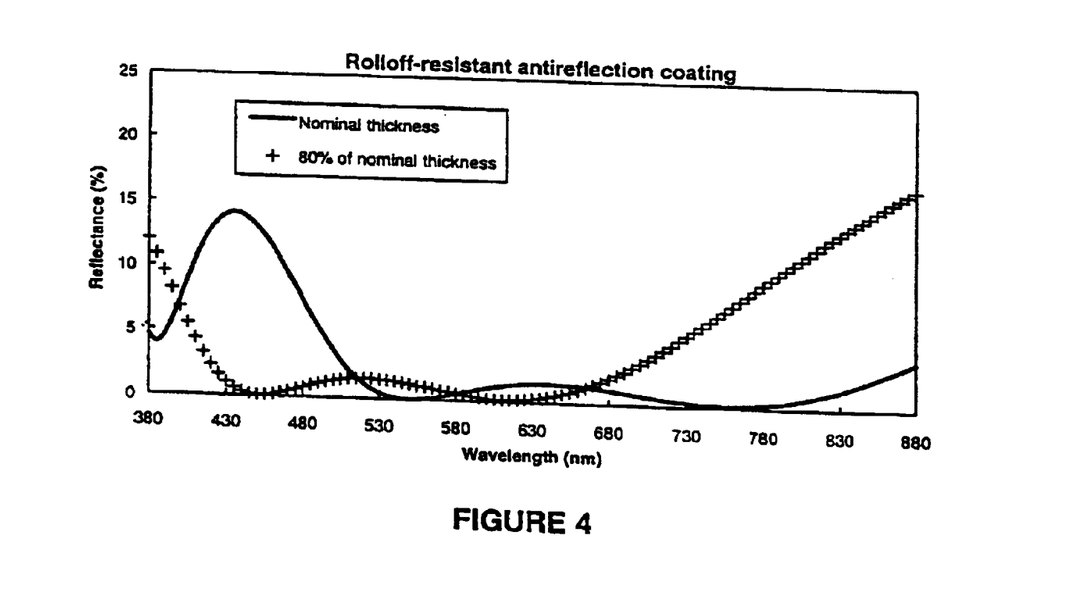
FIG. 4 illustrates the calculated reflectance spectrum for a CR39 lens coated on both sides with the balanced reflectance coating, as well as the reflectance spectrum when the coating thickness is reduced by 20%.

FIG. 4 illustrates the calculated reflectance spectrum for a CR39 lens coated on both sides with the roll-off-resistant coating, as well as the reflectance spectrum when the coating thickness is reduced by 20%, as may be the case on the edge of a highly curved lens or in a deposition system that produced coatings of highly non-uniform thickness.

The lens displays relatively little luminance roll-off, with the luminous intensity of the reflection reducing from 1.3% to only 0.9% as the thickness of the coating is reduced by 20%. The lens changes from deep purple ($h^*=309°$) through blue, to green ($h^*=164°$). The change in hue is significant, yet despite these changes in hue, the lens remains highly anti-reflective. Such a multicoloured anti-reflection coating as would occur on a highly curved lens may be aesthetically pleasing.

TABLE 4

Optical design for a balanced reflectance anti-reflection coating

| Layer | Thickness (nm) |
|---|---|
| CR39 lens element substrate | |
| SiO2 | 18 |
| TiO2 (n(500 nm) = 2.15) | 25.7 |
| SiO2 | 20.1 |
| TiO2 (n(500 nm) = 2.15) | 118.7 |
| Al2O3 (n(500 nm) = 1.64) | 15.7 |
| SiO2 | 90.7 |

EXAMPLE 5
Balanced Reflectance Mirror Coating

Table 5 shows the calculated optical designs for mirror coatings whose reflectance is robust to colour roll-off when their thickness varies. The colour variations correspond to a thickness reduction of 20% and are clearly quite small.

Figure 5:
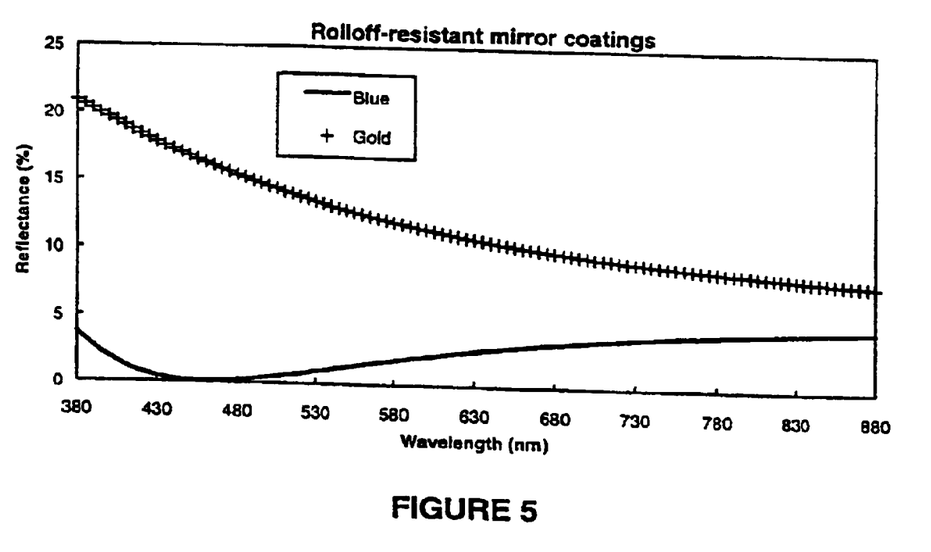
FIG. 5 illustrates the corresponding calculated reflectance spectra for tinted CR39 lenses coated on the front surface with the balanced reflectance coatings.

FIG. 5 illustrates the corresponding calculated reflectance spectra for tinted CR39 lenses coated on the front surface with the roll-off-resistant coatings. It can be seen that the resistance to colour roll-off has been achieved by designing the coating to display a relatively flat reflectance in the near infra-red spectrum, as opposed to a minimal infra-red reflectance as was the case for the roll-off-resistant anti-reflection coatings. In addition, the spectra do not display sharp structure in the visible wavelengths from 380–780 nm.

TABLE 5

Optical d signs for balanced refl ctance mirror coatings

| Colour | Blue | Gold |
| --- | --- | --- |
| Substrate | CR39 | CR39 |
| Layer 1 | 24.4 nm TiO2 | 14.8 nm TiO2 |
| Layer 2 | 20 nm SiO2 | 100 nm SiO2 |
| Luminance, Y | 11.6% | 2.3% |
| Hue, h* | 270° | 80° |
| Luminance change, ΔY | −2.4% | 2.4% |
| Hue change, Δh* | 1° | 15° |
| Colour difference, ΔE | 2.4 | 12 |

What is claimed is:

1. An optical lens with a coating varying substantially in thickness from its center to a radius proximate its edge but having substantially uniform color from its center to the radius proximate its edge comprising
   an ophthalmic lens element having a curved surface with a curvature from the center to the radius proximate its edge corresponding to at least 6 D; and
   an antireflection coating on the curved surface of the lens element exhibiting a reflected color difference (ΔE) from the center to the radius proximate the edge of the lens element of less than 11 CMC color difference units.

2. A coated optical lens according to claim 1 wherein the lens element is of generally ovaline we and curvature from the center to the radius proximate its shape edge corresponds to 11 D or above.

3. A coated optical lens according to claim 1 wherein the coating exhibits a substantially low photopic reflectance in the red to infrared wave length range of approximately 620 to 880 nm.

4. A coated optical lens according to claim 3 wherein the substantially low photopic reflectance is less than approximately 3%.

5. A coated optical lens according to claim 4 wherein the coating exhibits a substantially uniform appearance from the center to the radius proximate the edge of the lens element.

6. A coated optical lens according to claim 1 wherein, in use, the coating exhibits a reflected color difference from the center to a radius of approximately 20 mm on the lens surface of less than approximately 11 CMC color difference units or less.

7. A coated optical lens according to claim 1 which coating includes a plurality of layers, the thickness and/or number of which are selected to provide the substantially uniform color in response to visual effects generated by variations in thickness of the coating.

8. A coated optical lens according to claim 7 including a plurality of layers of differing refractive index wherein the thickness and/or number of the respective layers are selected to balance the variation of any combination of reflectance lightness, hue and chroma.

9. A coated optical lens according to claim 8 where the layers of differing refractive index are formed from a dielectric material selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $TiO_3$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF_2$, $NaF$, $Na_3AlF_6$, $NdF_3$, $PbF_2$, $PrF_3$, $SrF_2$, $ThF_4$, $ZrF_4$, $Si_3N_4$, AlN, diamond-like carbon, polymeric dielectric materials or doped dielectric martial.

10. A coated optical lens according to claim 9 wherein the lower index layers include a silica ($SiO_2$) or magnesium fluoride ($MgF_2$) material.

11. A coated optical lens according to claim 10 wherein the higher refractive index layer(s) exhibit a refractive index of approximately 2.0 or greater.

12. A coated optical lens according to claim 11 wherein the higher refractive index layer(s) include a titanium oxide ($TiO_2$) layer or a combination of titanium oxide ($TiO_2$) and praseodymium oxide ($Pr_2O_3$).

13. A coated optical lens according to claim 12 including four to six alternating higher and lower refractive index layers of silica ($SiO_2$) and a titanium oxide ($TiO_2$) layer or a combination of titanium oxide ($TiO_2$) and praseodymium oxide ($Pr_2O_3$).

14. A coated optical lens according to claim 7 wherein the coating is formed of a plurality of dielectric and metallic layers wherein the thickness and/or number of the respective layers are selected to balance the variation of any combination of reflected lightness, hue and chroma.

15. A coated optical lens according to claim 14 wherein the dielectric layer(s) is formed from a dielectric material selected from one or more of $Al_2O_3$, $BaTiO_3$, $Bi_2O_3$, $B_2O_3$, $CeO_2$, $Cr_2O_3$, $Ga_2O_3$, $GeO_2$, $Fe_2O_3$, $HfO_2$, $In_2O_3$, Indium-tin oxide, $La_2O_3$, $MgO$, $Nd_2O_3$, $Nb_2O_5$, $Pr_2O_3$, $Sb_2O_3$, $Sc_2O_3$, $SiO$, $SiO_2$, $SnO_2$, $Ta_2O_5$, $TiO$, $TiO_2$, $TiO_3$, $WO_3$, $Y_2O_3$, $Yb_2O_3$, $ZnO$, $ZrO_2$, $AlF_3$, $BaF_2$, $CaF_2$, $CdF_2$, $CeF_3$, $HfF_4$, $LaF_3$, $LiF$, $MgF_2$, $NaF$, $Na_3AlF_6$, $Na_5Al_3F_{14}$, $NdF_3$, $PbF_2$, $PrF_3$, $SrF_2$, $ThF_4$, $ZrF_4$, $Si_3N_4$, AlN, or diamond-like carbon, polymeric dielectric materials or doped dielectric materials; and the metallic layer(s) is formed from a metallic material selected from the metals, metal oxides or metal nitrides of one or more of Aluminum (Al), Chromium (Cr), Niobium (Nb), Nickel (Ni), Palladium (Pd), Tin (Su), Tantalum (Ta), Titanium (Ti), Tungsten (W), or Zirconium (Zr).

16. A coated optical lens according to claim 14, wherein the coating is a light absorbing asymmetric reflectance coating such that from the wearer's side of the lens element the coating is anti-reflective.

17. A coated optical lens of claim 1, wherein the coating varies by at least 20% in thickness from its center to the radius proximate its edge.

18. A multi-coated optical lens with at least one coating varying substantially in thickness from center to edge but having a substantially uniform color from center to edge including
   an ophthalmic lens element having a curved surface with a curvature from the center to a radius proximate its edge which corresponds to at least 6 D;
   a first coating on the front surface of the lens element; and
   a secondary coating on the back surface of the lens element; the first and second coatings in combination exhibiting a reflected color difference (ΔE) from the center to the radius proximate the edge of the lens element of less than 11 CMC color difference units.

19. A multi-coated optical lens according to claim 18, wherein the secondary coating functions to reduce optical aberrations generated by the first coating.

20. A multi-coated optical lens according to claim 19, wherein the secondary coating exhibits a difference in reflected brightness or hue relative to the first coating.

21. A multi-coated optical lens according to claim 19, wherein the secondary coating exhibits a reflectance peak which is spectrally displaced with respect to a reflectance peak of the first coating.

22. A coated optical lens of claim 18, wherein at least one of the first and secondary coatings varies by at least 20% in thickness from its center to the radius proximate its edge.

23. An optical lens with a coating varying substantially in thickness from center to edge and having a visible, balanced change in color from center to edge comprising:
an ophthalmic lens element having a curved surface with a base curvature from the center to a radius proximate its edge corresponding to at least 6 D; and
an antireflection coating on the curved surface of the lens element exhibiting a reflected color difference ($\Delta E$) from the center to the radius proximate its edge from approximately 11 to 20 CMC color difference units, wherein the color difference is balanced by a complementary reduction in luminous intensity.

24. A coated optical lens according to claim 23 wherein the coating exhibits a reflected color difference ($\Delta E$) from the center to a radius of approximately 20 mm on the lens surface of from approximately 11 to 20 CMC color difference units.

25. A coated optical lens of claim 23, wherein the coating varies by at least 20% in thickness from center to edge.

26. A mirror-coated optical lens having a mirror coating which exhibits a substantial variation in thickness from center to edge but has substantially uniform color from center to edge comprising:
an optical lens element having a curved surface with a base curvature from the center to a radius proximate its edge corresponding to at least 11 D; and
wherein the mirror coating is on the curved surface of the lens element and exhibits a reflected color difference ($\Delta E$) from its center to the radius proximate its edge of less than 11 CMC color difference units.

27. A mirror coated optical lens according to claim 26 wherein, in use, the coating exhibits a reflected color difference from the center to a radius of approximately 20 mm on the lens surface of approximately 11 to 12 CMC color difference units.

28. A coated optical lens of claim 26, wherein the coating varies by at least 20% in thickness from center to edge.

* * * * *